June 2, 1964     M. C. AGENS     3,135,564
ANTI-FRICTION BEARING AND METHOD OF MAKING SAME
Filed Dec. 27, 1961
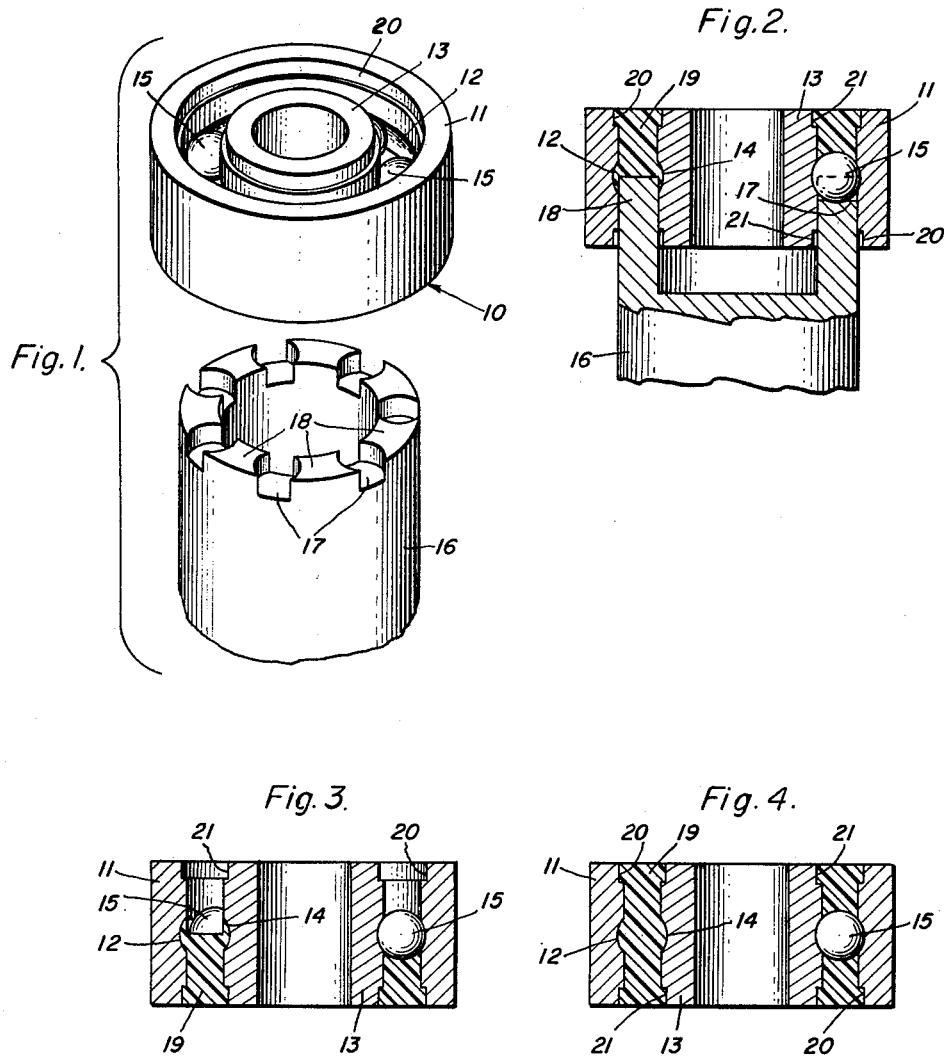
Inventor:
Maynard C. Agens
by *James N. Underwood*
His Agent

United States Patent Office 3,135,564
Patented June 2, 1964

3,135,564
ANTI-FRICTION BEARING AND METHOD OF MAKING SAME
Maynard C. Agens, Schenectady, N.Y., assignor to General Electric Company, a corporation of New York
Filed Dec. 27, 1961, Ser. No. 162,415
10 Claims. (Cl. 308—187)

This invention relates to an improved bearing and a novel method of fabrication and lubrication of the bearing to maintain low friction in the so-called anti-friction bearings of the rolling element type together with the method of fabrication which permits the elimination of the retaining ring for the anti-friction elements so as to eliminate one source of friction.

The rolling element type of bearing, including the ball type, roller type, needle type, tapered roller type, etc., represents various types of bearings depending essentially on a load-bearing, rolling element for motion and require lubrication in definite form such as periodic applications of oils and greases or sealed units containing a lubricant supply and feed to the bearing.

In the anti-friction bearing, friction occurs primarily between the rolling element retaining ring and the rolling element due to rubbing friction and also between the rolling element and its races or tracks through a combination of rolling and rubbing friction. Lubrication of such bearings by means of oils or greases requires that a seal be provided to retain the lubricant between the inner and outer rings so that it may be available for lubrication of the bearing. The fabrication and installation of the retaining ring to maintain the rolling elements in a fixed relative position within the annular space between the inner and outer rings requires care and additional process steps which add to the overall cost of the bearing. This is also true of the end rings required to retain the lubricant. It is obvious, therefore, that a bearing which eliminates these parts would not only produce a bearing which is cheaper and easier to fabricate, but would also eliminate one of the major sources of friction within the bearing.

It is, therefore, an object of this invention to provide an improved rolling element type of bearing.

It is another object of this invention to eliminate the cage or retaining ring as a source of friction in the rolling element type bearing.

It is another object of this invention to provide an element which acts both as a source of lubricant and a means of retaining the rolling elements in a relative fixed position around the annular space between the inner and outer rings.

It is a further object of this invention to provide improved, continual lubrication of the rolling element type of bearing.

This invention will be better understood when the following description is read in connection with the drawing, in which:

FIG. 1 is an isometric drawing showing the assembled inner and outer rings and rolling elements with the co-operating fixture used to hold the rolling elements in their relative fixed position in the annular space between the inner and outer rings in one of the preferred ways used in the fabrication of the combined retainer and source of lubricant for the bearings of this invention;

FIG. 2 is a cross-sectional edge view of an embodiment of this invention showing the bearing and the co-operating fixture during the first step of the fabrication of the combined retainer and source of lubricant for a bearing according to my invention;

FIG. 3 is a cross-sectional side view of the invention illustrated in FIG. 2 after removal of the fixture and in-verting of the bearing shown in FIG. 2 preparatory to the finishing operation forming a part of this invention; and FIG. 4 is a cross-sectional side view of the bearing shown in FIG. 2 after completion of the final finishing step forming a part of this invention.

Previously it had been proposed to remove the retaining ring and to substitute therefor certain separating elements between the rolling elements of the bearing and also to incorporate within the separating elements some means of lubrication. With the well known greases and oils, the disadvantages in such a proposal have been that it is difficult to transmit the lubricant from the spacer means to the rolling means and sliding friction may be greater with such a device than when a retaining ring is used. Furthermore, such a proposal still required at least as many process steps as that required with the use of a retaining ring. It has been discovered that the twofold problem of reducing the process steps by complete removal of the retainer yet supplying lubricant to the bearing may be accomplished by using a plastisol containing a lubricant to surround and completely encase the rolling elements in the annular space of the bearing.

Specifically, and in relation to FIGS. 1–4, there is disclosed a bearing 10 composed of an outer ring 11 having a race 12 in the inner periphery of the ring and a coaxial inner ring 13 having a race 14 in the outer periphery of the ring. Between rings 11 and 13 there are positioned a plurality of rolling elements which ride in races 12 and 14 which may be of any desired configuration such as balls, rollers, tapered rollers, needles, etc. In one preferred form of this invention, they are balls 15 which hold rings 11 and 13 in coaxial relationship and prevent lateral movement between the two rings. Rings 11, 13 and the rolling elements 15 may be made of any suitable material, e.g., metal, molded plastics, etc., and each may be the same or a different material. The choice of a material or construction of these elements is determined by the requirements of the application in which these bearings will be used. Normally, these elements will be made of steel but may be other materials such as stainless steels, brass, aluminum alloys, molded plastics, for example, phenolic resins, urea resins, melamine resins, nylon, etc. Filling the space between the rolling elements and completely covering them is a solid plastisol 19 containing a lubricant which has been formed in place.

Plastisols are materials well known to those skilled in the art and are readily commercially available as a mixture of a solid or a thermoplastic polymer, usually a polymer of vinyl chloride suspended in a liquid plasticizer for the polymer to form a fluid mixture. The term "polymer of vinyl chloride" includes not only polyvinyl chloride itself but also the polymers produced by copolymerization of vinyl chloride with other polymerizable monomers such as vinyl acetate, vinylidene chloride, etc. The mixture of the resin and plasticizer known as a plastisol has the property that when it is heated to an elevated temperature, usually in the temperature range of 100° to 200° C., the plasticizer and resin form a solution which solidifies to form a plasicized solid whose hardness is dependent on the ratio of plasticizer to resin. I have found that if a lubricant, for example, a hydrocarbon oil having lubricating viscosity, or a grease, is dissolved in the fluid plastisol before it is heated, that the lubricant does not interfere with the ability of the plastisol to be converted to a solid, yet the lubricant is dispersed throughout the composition after the plastisol is solidified and is available to lubricate the bearing. If an excess of lubricant is used, the plastisol still can solidify and the excess lubricant exudes on to the surface and is readily removed. Surprisingly enough, the resin in solidifying does not cling tenaciously to either the rolling elements or to the inner and outer rings, so that all of these elements are easily freed to permit rotation in relationship to each other. The lubricant is continually supplied to all three of these elements by rubbing action against the solid plastisol. The solid plastisol containing the lubricant also acts as a retainer for the rolling elements to maintain them in their fixed relative position in the annular space between the inner and outer rings. By use of a polymerizable plasticizer for the polyvinyl chloride, e.g., diallyl phthalate, dimethallyl succinate, etc., it is possible to make cross-linked plastisols containing lubricant for this invention.

Referring now to FIG. 1, in one embodiment for making the bearings of this invention, bearing 10 with its associated rings 11, 13 and rolling elements 15 is positioned coaxially over fixture 16 having rolling element receiving cavities 17 and spacing fingers 18. Fixture 16 may be made of rigid tubing or a ring may be machined on one or both ends of a solid bar, rod, etc., of rigid material, e.g., metal, plastic, etc. Alternatively, it may also be made of the solidified plastisol containing a lubricant which becomes an integral part of the bearing and necessitates only one filling and heating step described below. The rolling elements 15 are spaced so that fixture 16 may be inserted into the annular space between rings 11 and 13 to hold rolling elements 15 within cavities 17, as shown in FIG. 2. Fluid plastisol containing lubricant is poured into the annular space shown in FIG. 2 in sufficient quantity to fill all the space between the rolling elements 15 and to completely cover them FIG. 2 shows a preferred embodiment where sufficient plastisol is poured in to completely fill the top half of the annular space between rings 11 and 13. If it is desired to incorporate a dust and dirt seal, one or more grooves 20 are provided in the inner periphery of ring 11 and one or more grooves 21 are provided in the outer periphery of ring 13 so that there is no straight-line path for dirt and dust to travel from the outside of the bearing to the rotating elements. As illustrated in FIGS. 2 and 4, grooves 20 and 21 are on the outer edge, but may be at any desired place on the periphery shown and the plastisol may then be filled beyond grooves 20 and 21, if desired.

With the fixture 16 still inserted, the plastisol is heated to an intermediate stage where it solidifies and becomes self-supporting but is not as completely solidified as it will become on further heating. This is necessary to permit the plastisol added in the second step to weld to and form a firm bond with the plastisol added in this first step. The bearing is removed from fixture 16 and inverted as shown in FIG. 3. Fluid plastisol containing lubricant is then poured into the annular space between rings 11 and 13 so as to fill the space between and completely cover the balance of the rolling elements exposed by the removal of fixture 16. In the preferred embodiment the plastisol 19 is added in sufficient quantity to fill the annular space, as shown in FIG. 4. Thereafter, the plastisol 19 is solidified by heating to a sufficient temperature and for a sufficient length of time for it to acquire a firm, rigid, formed-in-place structure. The time and temperature used are not critical. The time need only be sufficient for the plastisol to acquire the desired firmness, but additional time causes no adverse effect. The temperature used should be sufficiently high to cause the fluid plastisol to solidify in a reasonable time but not so high as to cause thermal decomposition. These factors are well known to those familiar with the use of plastisols.

The bearing is then ready for use in any application for which such bearings are to be used, for example, to support the shaft in an electric motor, the shaft of a fan in a housing, etc., without any necessity for adding further lubricant during the life of the bearing. If, during the use of the bearing, an accumulation of dirt is formed on the surface of the bearing, it may be washed off or otherwise removed and if desired the bearing may be immersed in a liquid or molten lubricant to supply additional lubricant which may have escaped and been washed away by cleaning along the edges where the plastisol meets the inner and outer rings.

As can be seen from the above description, this method of fabrication of a bearing is extremely simple and eliminates the necessity for using a retaining ring for holding the rolling elements in a relative fixed position in the annular space between the inner and outer rings. However, without departing from the spirit of this invention, it would be possible to incorporate the retaining ring in the bearing and still use the plastisol containing the lubricant to act as a dust and dirt stop and a source of lubricant for the bearing.

This method of lubrication has proven to be exceptionally applicable not only to larger sized bearings but also to those miniature bearings of the ball type approaching ⅛ inch in outside diameter where lubrication is difficult and use of a retaining ring is difficult as well as uneconomical.

In incorporating the lubricant into the fluid plastisol, I have determined that the ratio of resin, plasticizer, and lubricant may be varied over an extremely wide range to produce a wide variety of compositions useful in making the bearings described above. In the following description, all parts and percentages are by weight, unless otherwise noted. When polyvinyl chloride is used as the resin, the plasticizer may be omitted entirely providing the lubricant is a grease, for example, a lubricating oil containing a structure producing additive, for example, an alkali metal or alkaline earth metal salt of a $C_{12-18}$ monocarboxylic acid. For example, a plastisol made from 35 parts of polyvinyl chloride, 20 parts of SAE #20 oil and 5 parts of lithium stearate may be used for filling the annular space in the bearing. A lubricating oil without plasticizer may be used alone, but considerable oil exudes from the solidified plastisol and is, therefore, not available to lubricate the rolling elements. The plastisol is converted to a solid in the first pouring step by heating at 150° C. for 5 minutes and further solidified after the second filling step at 175° to 200° C. for 10 minutes. From the standpoint of ease of handling and the amount of oil available to act as a lubricant, this composition represents about the minimum amount of grease that may be used. However, larger amounts may be used without oil or grease separation. For example, a composition containing 50 parts polyvinyl chloride, 30 parts of SAE #20 oil and 10 parts lithium stearate produces a more fluid composition at room temperature. Another satisfactory composition contains 56.9% polyvinyl chloride, 28.4% SAE #20 oil, and 14.7% lithium stearate. Both of these compositions may be used and solidified in the same way as described above, or as shown in Example 1. If too much grease or oil is used, it does no harm since it merely exudes from the solidified plastisol and may be wiped off the surface, but to have the maximum amount of lubricant available, it is desirable to make the composition so that little if any oil or grease is exuded when the plastisol is solidified.

Lesser amounts of oil may be used providing a plasticizer for the polyvinyl chloride is used since the latter apparently makes the oil more readily available for lubrication. I have made satisfactory bearings, for example, using the following compositions shown in Table I where the polymer is polyvinyl chloride, the plasticizer is dioctylphthalate, the oil is SAE #20 lubricating oil and the proportions of the ingredients are percentages.

TABLE I

| Polymer | Plasticizer | Lubricant |
| --- | --- | --- |
| 50.0 | 33.4 | 16.6 |
| 50.2 | 38.8 | 11.0 |
| 50.0 | 41.7 | 8.3 |
| 56.7 | 37.6 | 5.7 |
| 12.5 | 83.4 | 4.1 |

Plastisol compositions containing both plasticizer and a grease I have used to make bearings according to this invention are shown in Table II where the resin is polyvinyl chloride, the plasticizer is dioctylphthalate, and the proportions are percentages.

TABLE II

| Resin | Plasticizer | Lubricant (Grease) | |
|---|---|---|---|
| | | Oil | Soap |
| 53.5 | 6.1 | 26.7 SAE #20 | 13.7 lithium stearate. |
| 45 | 25 | 15 SAE #20 | 15 lithium hydroxy stearate. |
| 45 | 15 | 25 SAE #90 | Do. |
| 48.7 [1] | 16.3 | 24.5 SAE #10 | 10.5 lithium hydroxy stearate. |
| 52.5 | 17.5 | 20 SAE #10 | 10 lithium hydroxy stearate. |
| 42 | 18 | 25 SAE #20 | 15 lithium hydroxy stearate. |
| 36 | 24 | 25 SAE #20 | 20 lithium hydroxy stearate. |

[1] Composition also contained 1% of a stabilizer for the polyvinyl chloride.

The following examples describe the use of compositions typical of the above in the making of bearings and the testing of the bearings under actual operating conditions.

*Example 1*

Several bearings in each of the following sizes were made in the general procedure described above, some with a 2-inch outside diameter with a 25 millimeter bore (size 205), some with a 2-inch outside diameter and a 35 millimeter bore (size 207), and some with a 3-inch diameter with a 40 millimeter bore (size 308). The plastisol composition used contained 47.7% polyvinyl chloride, 15.9% dioctylphthalate, 18.2% SAE #20 lubricating oil, 9.1% lithium hydroxy stearate, and 9.1% of fibrous polytetrafluoroethylene as a filler. Each bearing was placed on the fixture to engage the balls and the annular space filled with the plastisol which was solidified by heating for 5 minutes at 150° C. After cooling, the bearing was removed from the fixture and inverted and the balance of the annular space filled with the same plastisol which was then solidified by heating for 15 minutes at 150° C. followed by heating for 5 minutes at 200° C. After cooling, the balls and inner and outer rings were freed by holding the inner ring and rotating the outer ring a few times with slight radial pressure. The size 205 bearings were installed in a motor and run with no load at a speed of 3600 r.p.m. for over 5,000 hours. The sizes 207 and 308 bearings were run at a speed of 1800 r.p.m. with a bearing load of 135 and 930 pounds, respectively, for over 2,600 hours. Motors containing the 207 and 308 size bearings were also run at 1800 r.p.m. for 20 hours in a cement dust atmosphere without any apparent damage.

*Example 2*

The annular space of two bearings each 30 millimeters in outside diameter and having 10 millimeter bores was filled with the following plastisol composition in the same way as described above in Example 1. The plastisol contained 42 parts polyvinyl chloride, 18 parts dioctylphthalate, 25 parts SAE #20 lubricating oil, 15 parts lithium hydroxy stearate. These bearings were mounted on a shaft having the same diameter as the bore of the bearing and subjected to 10 to 13 pounds load by spring loading in a fixture restraining the outer ring of both bearings. The fixture was connected to a strain gauge to measure the torque transmitted to the outer ring which is a measure of the internal friction in the bearings. The shaft was rotated by means of a motor at 1,725 r.p.m. during a 2-hour test period. Torque and temperature of the bearings were measured every 15 minutes. The results are shown in Table III.

TABLE III

| Time | Temp., ° F. | | Torque, gm. inches |
|---|---|---|---|
| | #1 | #2 | |
| Start | 75 | 75 | 161.4 |
| 5 | 87 | 87 | 110.0 |
| 20 | 96.5 | 96 | 80.7 |
| 35 | 98 | 100 | 66 |
| 50 | 98 | 100 | 51.4 |
| 65 | 98 | 99 | 51.4 |
| 80 | 98 | 98 | 51.4 |
| 95 | 98 | 98 | 47 |
| 110 | 98 | 98 | 47 |
| 125 | 98 | 98 | 47 |

The speed of the shaft was then increased to 3600 r.p.m. and the same measurements made, with the results as shown in Table IV.

TABLE IV

| Time | Temp., ° F. | | Torque, gm. inches |
|---|---|---|---|
| | #1 | #2 | |
| Start | 84 | 84 | 70.5 |
| 5 | 90 | 90 | 58.7 |
| 20 | 99 | 99 | 55.8 |
| 35 | 104 | 104 | 44.1 |
| 50 | 105 | 106 | 44.1 |
| 65 | 106 | 106 | 39.7 |
| 80 | 106 | 106 | 39.7 |
| 95 | 107 | 107 | 39.7 |
| 110 | 107 | 107 | 39.7 |
| 125 | 106 | 106 | 39.7 |

At the end of this second test, the No. 2 bearing was removed and substituted with a standard type of bearing and the test continued using a rotational speed of 3,600 r.p.m. At the start of the test, both the test and standard bearing were operating at a bearing temperature of 83° F. and the torque was 146.8 gram inches. The test was continued for a total of 161 days during which time the temperature of both the test and standard bearing and the torque were measured. At no time did the temperature of the two bearings vary by more than 2 degrees, and was usually in a temperature range of 100°–105° F. At the end of the test period, the bearings were both operating satisfactorily. The temperature of each bearing was 105° and the torque was 44 gram inches.

While several modifications have been disclosed and discussed herein, it will be understood that the invention is not limited to those specific details of construction and that still further changes and modifications will generally occur to those skilled in the art. For example, known solid lubricants such as molybdenum disulfide, tin disulfide, graphite, etc., or non-abrasive fillers such as abestos fibers, synthetic resin or natural fibers, glass fibers, cellulose fibers, α-cellulose fibers, woven cloth in chopped or precut form, dyes, pigments, heat and light stabilizers, high pressure additives, etc., may be included in the plastisol compositions. Likewise, it is possible to make the fixture 16 from a preformed plastisol containing lubricant which is solidified to the intermediate stage previously described so that only one pouring operation of the liquid plastisol containing lubricant need be made in fabricating the bearing. A preformed plastisol disk containing lubricant may be inserted and pressed into the top surface of the plastisol after either one or both of the filling operations. By this means, a plastisol composition containing a higher proportion of lubricant may be used to encapsulate the rolling elements while a harder plastisol containing lubricant may be used as the outer shell. Likewise, in using preformed disks, one or more layers of cloth or other reinforcing fillers, e.g., fibers, mats, etc., may be used to act as reinforcement to further strengthen the plastisol composition. It is therefore intended to cover by the appended claims all such changes and modifications as fall within the true scope and spirit of this invention.

What I claim as new and desire to secure by Letters Patent of the United States is:

1. A self-contained, lubricated anti-friction bearing having component parts comprising an inner ring having a race on the outer periphery and a coaxial outer ring having a race on the inner periphery, a plurality of rolling elements carried in said races and being movable relative thereto, and a formed-in-place, unitary, solid plastisol containing a lubricant completely filling the annular space between the rings and rolling elements to a sufficient depth that the rolling elements are completely covered.

2. A bearing as in claim 1 wherein the plastisol is a composition comprising a polymer of vinyl chloride.

3. A bearing as in claim 1 wherein the lubricant is a hydrocarbon oil having lubricating viscosity.

4. A bearing as in claim 1 wherein the lubricant is a lubricating grease.

5. A self-contained, lubricated anti-friction bearing having component parts comprising an inner ring having a race on the outer periphery, a coaxial outer ring having a race on the inner periphery, a plurality of rolling elements carried in said races and being movable relative thereto, and a formed-in-place, unitary, solid composition comprising a solid plastisol of a polymer of vinyl chloride having incorporated therein a lubricant comprising a hydrocarbon oil of lubricating viscosity completely filling the annular space between the rings and rolling elements to a sufficient depth that the rolling elements are completely covered.

6. In the process of making an anti-friction bearing comprising an outer ring, an annular inner ring and a plurality of rolling elements, the improvement which comprises encasing the rolling elements in a formed-in-place, unitary, solid plastisol containing a lubricant which completely fills the annular space between the rings and rolling elements to a sufficient depth to completely cover the rolling elements.

7. The process of claim 6 wherein the plastisol is a polymer of vinyl chloride.

8. The process of claim 6 wherein the lubricant is an oil of lubricating viscosity.

9. The process of claim 6 wherein the lubricant is a lubricating grease.

10. In the process of making an anti-friction bearing the improvement which comprises inserting a fixture between the inner and outer rings to engage and hold the plurality of rolling elements carried in the races of the inner and outer rings in a fixed relative position, completely filling the annular space between said inner and outer rings to a depth that covers the rolling elements with a fluid plastisol containing a lubricant, heating said plastisol to the stage where it is self-supporting and will hold the anti-friction elements in their fixed relative positions but may be further solidified on further heating, removing said fixture and completely filling the balance of the annular space between said rings and rotating elements to a sufficient depth that the rotating elements are completely covered them with said fluid plastisol containing a lubricant, and heating to solidify the plastisol composition.

References Cited in the file of this patent

UNITED STATES PATENTS

| | | |
|---|---|---|
| 2,468,171 | Carlson | Apr. 27, 1949 |
| 2,775,793 | Cotchett | Jan. 1, 1957 |
| 2,848,791 | Neese | Aug. 26, 1958 |
| 2,910,765 | Heim | Nov. 3, 1959 |
| 2,984,963 | Reuter | May 23, 1961 |
| 2,987,350 | Hay | June 6, 1961 |
| 2,998,635 | Burritt | Sept. 5, 1961 |
| 3,027,206 | Potter | Mar. 27, 1962 |

FOREIGN PATENTS

| | | |
|---|---|---|
| 572,706 | Great Britain | Oct. 19, 1945 |
| 873,020 | Germany | Apr. 9, 1953 |